(12) United States Patent
Huang et al.

(10) Patent No.: US 11,899,857 B1
(45) Date of Patent: Feb. 13, 2024

(54) TOUCHPAD MODULE AND COMPUTING DEVICE USING THE TOUCHPAD MODULE

(71) Applicant: Primax Electronics Ltd., Taipei (TW)

(72) Inventors: Wei-Chiang Huang, Taipei (TW); Hung-Wei Kuo, Taipei (TW); Chao-Wei Lee, Taipei (TW); Chen-Yu Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/119,093

(22) Filed: Mar. 8, 2023

(30) Foreign Application Priority Data

Dec. 29, 2022 (TW) ................................. 111150732

(51) Int. Cl.
*G06F 3/0354* (2013.01)
*G06F 1/16* (2006.01)

(52) U.S. Cl.
CPC .......... *G06F 3/03547* (2013.01); *G06F 1/169* (2013.01); *G06F 2203/0339* (2013.01)

(58) Field of Classification Search
CPC ................ G06F 3/03547; G06F 1/169; G06F 2203/0339
See application file for complete search history.

(56) References Cited

U.S. PATENT DOCUMENTS

| | | | |
|---|---|---|---|
| 2011/0227872 A1* | 9/2011 | Huska | G06F 3/016 345/174 |
| 2011/0285627 A1* | 11/2011 | Lan | G01R 33/00 345/161 |
| 2013/0119489 A1* | 5/2013 | Chang | B81C 1/00293 257/E31.117 |
| 2016/0159638 A1* | 6/2016 | Chen | B81B 3/0086 257/417 |
| 2017/0285781 A1* | 10/2017 | Degner | H01H 25/041 |
| 2018/0024648 A1* | 1/2018 | Watanabe | G06F 3/0354 345/174 |
| 2018/0203570 A1* | 7/2018 | Franke | G06F 3/0418 |
| 2019/0235688 A1* | 8/2019 | Hoen | G06F 3/041 |
| 2020/0348757 A1* | 11/2020 | Forest | G06F 1/1616 |
| 2020/0371657 A1* | 11/2020 | Seyed Mousavi | G06F 3/0447 |
| 2021/0095949 A1* | 4/2021 | Gattere | H03K 17/975 |
| 2022/0363132 A1* | 11/2022 | Shirashima | G06F 3/016 |

* cited by examiner

*Primary Examiner* — Rodney Amadiz
(74) *Attorney, Agent, or Firm* — KIRTON McCONKIE; Evan R. Witt (57) ABSTRACT

A touchpad module includes a base plate, a touch member, a supporting structure and a pressure sensing unit. The touch member is movable toward the base plate. The supporting structure is arranged between the base plate and the touch member. The pressure sensing unit is installed on the touch member. The pressure sensing unit is arranged between the touch member and the base plate. While the touch member is pressed in response to an external pressing force, the touch member is moved downwardly toward the base plate to compress the supporting structure. Consequently, the supporting structure is subjected to deformation, and the touch member has a displacement amount. According to the displacement amount, a magnitude of the pressing force is sensed by the pressure sensing unit, and a pressure sensing signal is outputted from the pressure sensing unit.

9 Claims, 6 Drawing Sheets

TOUCHPAD MODULE AND COMPUTING DEVICE USING THE TOUCHPAD MODULE

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

For example, in case that the user's finger is placed on the touchpad and slid on the touchpad, a cursor shown on a display screen is correspondingly moved. Moreover, in case that the touchpad is pressed down by the user's finger, the electronic device executes a specified function. The use of the touchpad can implement some functions of the conventional mouse. In other words, the user may operate the electronic device through the touchpad without the need of additionally carrying or installing the mouse.

Nowadays, more and more touchpads are equipped with pressure sensors. When the user's finger presses the touchpad, a pressing force of the user applied to the touchpad is detected by the pressure sensor. Consequently, a pressure sensing signal is outputted. According to the pressure sensing signal, the electronic device executes the corresponding function. Recently, in most of the touchpads, the pressure sensor is installed on a deformable cantilever structure, which can be subjected to deformation in response to the pressing force. In other words, in case that the touchpad is pressed, the cantilever structure is pushed and subjected to deformation. According to the deformation amount of the cantilever structure, the pressure sensor senses the magnitude of the pressing force that is exerted on the touchpad.

However, the method of forming the cantilever structure still has some drawbacks. For example, plural cantilever structures have to be formed on a metallic base plate of the touchpad by a stamping process or other fabricating methods. In other words, the structure of the conventional touchpad with the pressure sensing function is complicated, and the conventional touchpad is manufactured with difficulty. Consequently, the fabricating cost of the touchpad is high.

Therefore, there is a need of providing an improved touchpad module in order to overcome the above drawbacks.

SUMMARY OF THE INVENTION

An object of the present invention provides a touchpad module. Due to the special design, the structure of the touchpad module is simplified, and the fabricating cost is effectively reduced.

Another object of the present invention provides a computing device with a touchpad module. The structure of the touchpad module is simplified, and the fabricating cost is effectively reduced.

The other objects and advantages of the present invention will be understood from the disclosed technical features.

In accordance with an aspect of the present invention, a touchpad module for a computing device is provided. The touchpad module is installed within a fixing frame of the computing device. The touchpad module includes a base plate, a touch member, a supporting structure and a pressure sensing unit. The touch member is located over the base plate. The touch member is movable toward the base plate. The supporting structure is arranged between the base plate and the touch member. The pressure sensing unit is installed on the touch member. The pressure sensing unit is arranged between the touch member and the base plate. While the touch member is pressed in response to an external pressing force, the touch member is moved downwardly toward the base plate to compress the supporting structure. Consequently, the supporting structure is subjected to deformation, and the touch member has a displacement amount. According to the displacement amount of the touch member, a magnitude of the pressing force exerted on the touch member is sensed by the pressure sensing unit, and a pressure sensing signal is outputted from the pressure sensing unit.

In an embodiment, the touch member includes a circuit board and a covering plate. The covering plate is located over the circuit board. The supporting structure is arranged between the circuit board and the base plate. The pressure sensing unit is installed on the circuit board. The pressure sensing unit and the circuit board are electrically connected with each other.

In an embodiment, the supporting structure is a rectangular raised structure, and the rectangular raised structure includes a first wall body, a second wall body, a third wall body and a fourth wall body. The first wall body and the second wall body are opposed to each other. The third wall body and the fourth wall body are opposed to each other. The first wall body and the second wall body are arranged between the third wall body and the fourth wall body. In addition, the first wall body, the second wall body, the third wall body and the fourth wall body are arranged around the pressure sensing unit.

In an embodiment, the supporting structure includes a first strip structure and a second strip structure. The first strip structure and the second strip structure are opposed to each other. The pressure sensing unit is arranged between the first strip structure and the second strip structure.

In an embodiment, the supporting structure includes a first post structure and a second post structure. The first post structure and the second post structure are opposed to each other. The pressure sensing unit is arranged between the first post structure and the second post structure.

In an embodiment, the supporting structure includes a first post structure, a second post structure, a third post structure and a fourth post structure, and the base plate is a rectangular plate. The first post structure, the second post structure, the third post structure and the fourth post structure are respectively located near four corners of the base plate. The pressure sensing unit is arranged between the first post structure, the second post structure, the third post structure and the fourth post structure.

In an embodiment, there is a first gap between the touch member and the base plate when the touch member is not pressed, and there is a second gap between the touch member and the base plate after the touch member is pressed down. The first gap is larger than the second gap. The displacement amount is equal to a difference value between the first gap and the second gap.

In an embodiment, the pressure sensing unit is a micro-electro-mechanical systems accelerometer.

In an embodiment, the supporting structure is made of a soft collapsible material.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a base plate, a touch member, a supporting structure and a pressure sensing unit. The touch member is located over the base plate. The touch member is movable toward the base plate. The supporting structure is arranged between the base plate and the touch member. The pressure sensing unit is installed on the touch member. The pressure sensing unit is arranged between the touch member and the base plate. While the touch member is pressed in response to an external pressing force, the touch member is moved downwardly toward the base plate to compress the supporting structure. Consequently, the supporting structure is subjected to deformation, and the touch member has a displacement amount. According to the displacement amount of the touch member, a magnitude of the pressing force exerted on the touch member is sensed by the pressure sensing unit, and a pressure sensing signal is outputted from the pressure sensing unit.

From the above descriptions, the present invention provides the touchpad module and the computing device using the touchpad module. In the touchpad module of the present invention, the pressure sensing unit is directly installed on the touch member. According to the displacement amount of the touch member relative to the base plate, the magnitude of the pressing force exerted on the touch member is calculated. Due to this structural design, it is not necessary to additionally install plural cantilever structures on the base plate. Since the structure of the touchpad module is simplified and the touchpad module is assembled easily, the fabricating cost and the overall weight of the touchpad module are effectively reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
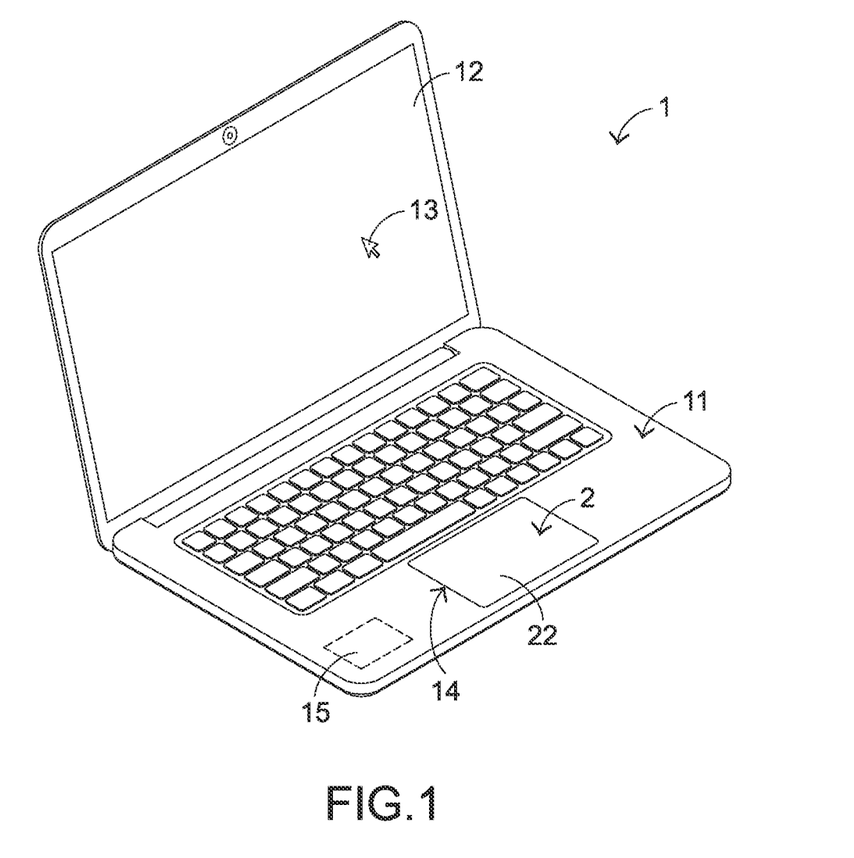
FIG. 1 is a schematic perspective view illustrating the outer appearance of a computing device with a touchpad module according to a first embodiment of the present invention.

FIG. 1 is a schematic perspective view illustrating the outer appearance of a computing device with a touchpad module according to a first embodiment of the present invention. An example of the computing device 1 includes but is not limited to a notebook computer. In an embodiment, the computing device 1 comprises a casing 11, a display screen 12, a processor 15 and a touchpad module 2. The processor 15 is disposed within the casing 11. The processor 15 is used for processing electronic signals of the computing device 1. Moreover, a fixing frame 14 is concavely formed in the casing 11. The touchpad module 2 is disposed within the fixing frame 14 and electrically connected with the processor 15. In addition, at least a portion of the touchpad module 2 is exposed outside so as to be touched by the user's finger. Consequently, the user can operate the touchpad module 2 to control the computing device 1. For example, in case that the user's finger is placed on the touchpad module 2 and slid on the touchpad module 2, a cursor 13 shown on the display screen 12 is correspondingly moved. Moreover, in case that the touchpad module 2 is pressed down by the user's finger, the computing device 1 executes a specified function.

The other structure of the touchpad module 2 will be described in more details as follows.

Figure 2:
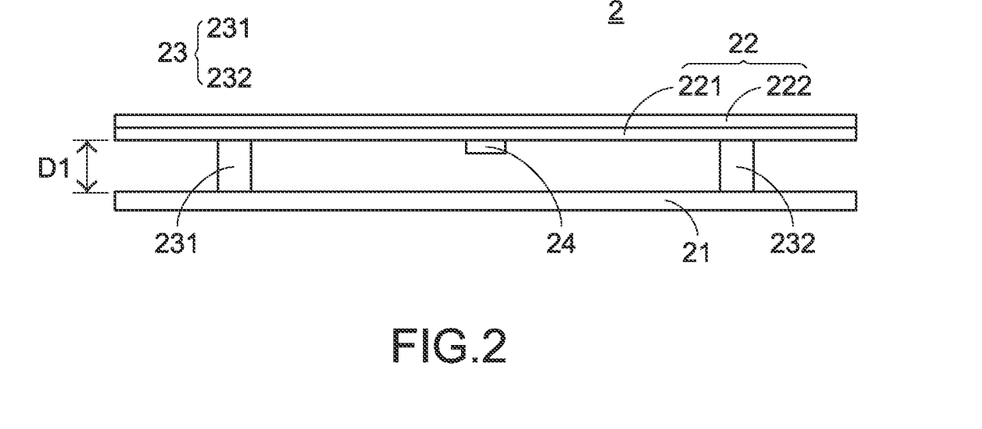
FIG. 2 is a schematic cross-sectional view illustrating the touchpad module as shown in FIG. 1 in an unpressed state.
Figure 3:
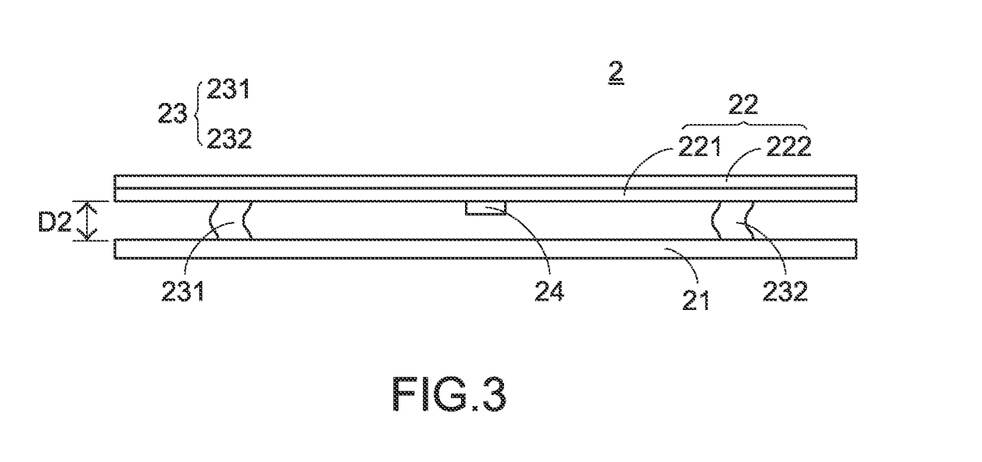
FIG. 3 is a schematic cross-sectional view illustrating the touchpad module as shown in FIG. 1 in a pressed state.
Figure 4:
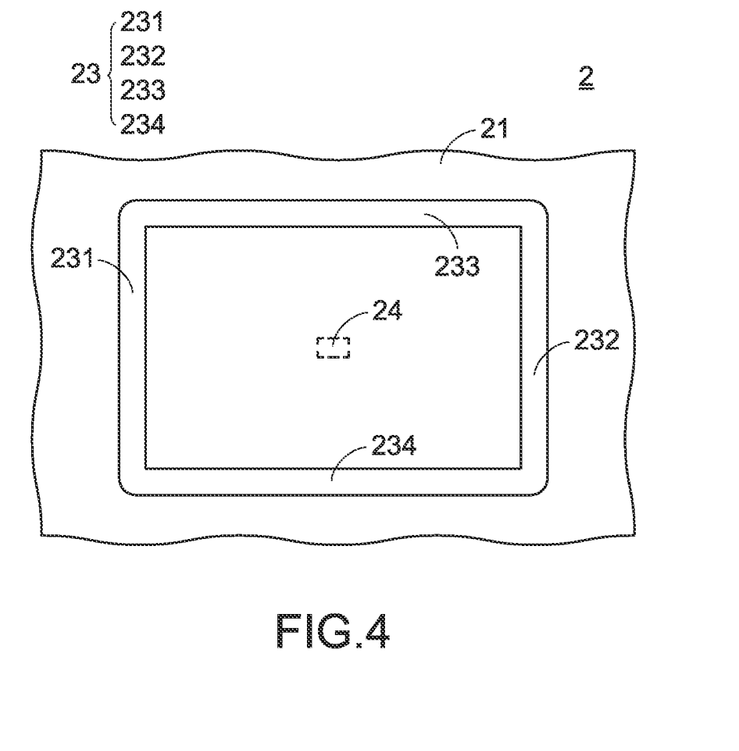
FIG. 4 is a schematic top view illustrating the touchpad module as shown in FIG. 1, in which the touch member is not shown.
Figure 5:
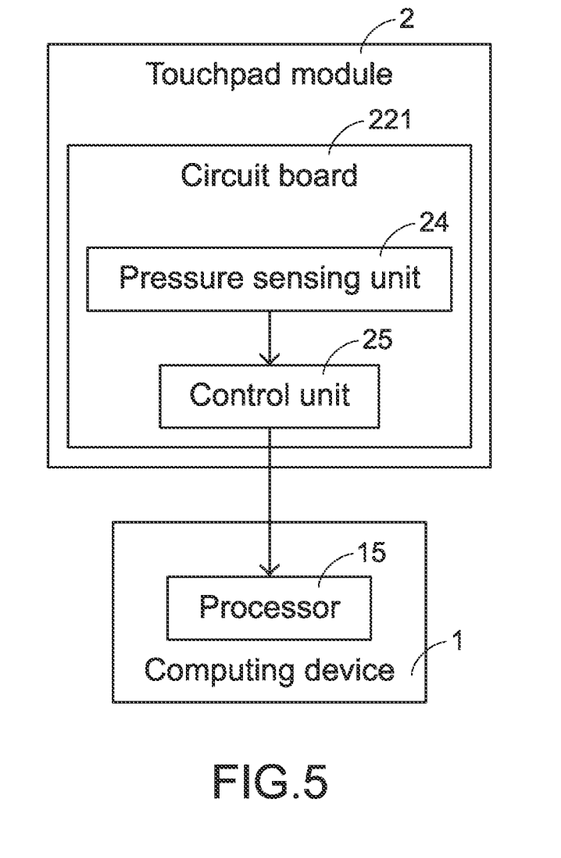
FIG. 5 is a schematic functional block diagram illustrating the touchpad module as shown in FIG. 1.

Please refer to FIGS. 2, 3, 4 and 5. FIG. 2 is a schematic cross-sectional view illustrating the touchpad module as shown in FIG. 1 in an unpressed state. FIG. 3 is a schematic cross-sectional view illustrating the touchpad module as shown in FIG. 1 in a pressed state. FIG. 4 is a schematic top view illustrating the touchpad module as shown in FIG. 1, in which the touch member is not shown. FIG. 5 is a schematic functional block diagram illustrating the touchpad module as shown in FIG. 1.

Please refer to FIGS. 2, 3, 4 and 5 again. In an embodiment, the touchpad module 2 comprises a base plate 21, a touch member 22, a supporting structure 23 and a pressure sensing unit 24. The touch member 22 is located over the base plate 21. When the touch member 22 is pressed in response to an external pressing force, the touch member 22 can be moved toward the base plate 21. The supporting structure 23 is arranged between the base plate 21 and the touch member 22. The pressure sensing unit 24 is installed on the touch member 32. In addition, the pressure sensing unit 24 is arranged between the touch member 22 and the base plate 21.

While the touch member 22 is pressed in response to the external pressing force, the touch member 22 is moved downwardly to compress the supporting structure 23. Consequently, the supporting structure 23 is subjected to deformation. Moreover, since the touch member 22 is moved in the direction toward the base plate 21, the touch member 22 has a displacement amount. According to the displacement amount of the touch member 22 relative to the base plate 21, the magnitude of the pressing force exerted on the touch member 22 is sensed by the pressure sensing unit 24. Consequently, the pressure sensing unit 24 issues a corresponding pressure sensing signal.

Preferably but not exclusively, the pressure sensing unit 24 is a micro-electro-mechanical systems accelerometer, and the supporting structure 23 is a soft collapsible material. In addition, the base plate 21 is made of a metallic material or any other appropriate material.

As mentioned above, in the touchpad module 2 of this embodiment, the pressure sensing unit 24 is directly installed on the touch member 22. After the pressing force is exerted on the touch member 22, the pressing force is converted into the displacement amount of the touch member 22 through the supporting structure 23. After the pressure sensing unit 24 on the touch member 22 senses the motion of the touch member 22, the magnitude of the pressing force exerted on the touch member 22 is calculated. Due to this structural design, it is not necessary to additionally install plural cantilever structures on the base plate 21. Since the structure of the touchpad module 2 is simplified and the touchpad module 2 is assembled easily, the fabricating cost and the overall weight of the touchpad module 2 are effectively reduced.

Please refer to FIGS. 2, 3 and 4 again. In an embodiment, the touch member 22 comprises a circuit board 221 and a covering plate 222. The covering plate 222 is located over the circuit board 221. The supporting structure 23 is arranged between the circuit board 221 and the base plate 21. In other words, the top side and the bottom side of the supporting structure 23 are respectively contacted with the circuit board 221 and the base plate 21. The pressure sensing unit 24 is installed on the circuit board 221. In addition, the pressure sensing unit 24 and the circuit board 221 are electrically connected with each other.

Preferably but not exclusively, the covering plate 222 is made of glass. The material of the covering plate 222 may be varied according to the practical requirements. Moreover, the circuit board 221 and the covering plate 222 are combined together through a pressure sensitive adhesive (PSA) or any other appropriate material. It is noted that the way of combining the circuit board 221 with the covering plate 222 is not restricted.

As shown in FIG. 4, the supporting structure 23 in the touchpad module 2 of this embodiment is a rectangular raised structure. In this embodiment, the rectangular raised structure comprises a first wall body 231, a second wall body 232, a third wall body 233 and a fourth wall body 234. The first wall body 231 and the second wall body 232 of the rectangular raised structure are opposed to each other. The third wall body 233 and the fourth wall body 234 the rectangular raised structure are opposed to each other. The first wall body 231 and the second wall body 232 are arranged between the third wall body 233 and the fourth wall body 234. In other words, the first wall body 231, the second wall body 232, the third wall body 233 and the fourth wall body 234 are connected with each other and collaboratively formed as a hollow rectangular profile of the rectangular raised structure. In addition, the first wall body 231, the second wall body 232, the third wall body 233 and the fourth wall body 234 of the rectangular raised structure are arranged around the pressure sensing unit 24.

The operations of the touchpad module 2 will be described in more details as follows.

Please refer to FIGS. 2, 3, 4 and 5 again. While the touch member 22 is pressed in response to the external pressing force, the touch member 22 is moved downwardly to compress the supporting structure 23. Consequently, the supporting structure 23 is subjected to deformation. Moreover, since the touch member 22 is moved in the direction toward the base plate 21, the touch member 22 has a displacement amount. According to the displacement amount of the touch member 22 relative to the base plate 21, the magnitude of the pressing force exerted on the touch member 22 is sensed by the pressure sensing unit 24. Consequently, the pressure sensing unit 24 issues a corresponding pressure sensing signal. The pressure sensing signal is transmitted to a control unit 25 on the circuit board 221 through the circuit board 221. Meanwhile, according to the pressure sensing signal, the control unit 25 issues a control signal to the processor 15 of the computing device 1. According to the control signal, the computing device 1 executes the corresponding function.

As shown in FIG. 2, the touch member 22 is in the unpressed state. Under this circumstance, there is a first gap D1 between the touch member 22 and the base plate 21. As shown in FIG. 3, the touch member 22 is in the pressed state. While the touch member 22 is pressed down in response to an external pressing force, the touch member 22 is moved downwardly to compress the supporting structure 23. Consequently, the supporting structure 23 is subjected to deformation. Moreover, since the touch member 22 is moved in the direction toward the base plate 21, the gap between the touch member 22 and the base plate 21 is reduced to a second gap D2. The first gap D1 between the touch member 22 and the base plate 21 is larger than the second gap D2 between the touch member 22 and the base plate 21. In other words, the displacement amount of the touch member 22 in response to the external pressing force is equal to the difference value between the first gap D1 and the second gap D2. According to the difference value between the first gap D1 and the second gap D2, the magnitude of the pressing force exerted on the touch member 22 is sensed by the pressure sensing unit 24. Consequently, the pressure sensing unit 24 issues a corresponding pressure sensing signal.

Figure 6:
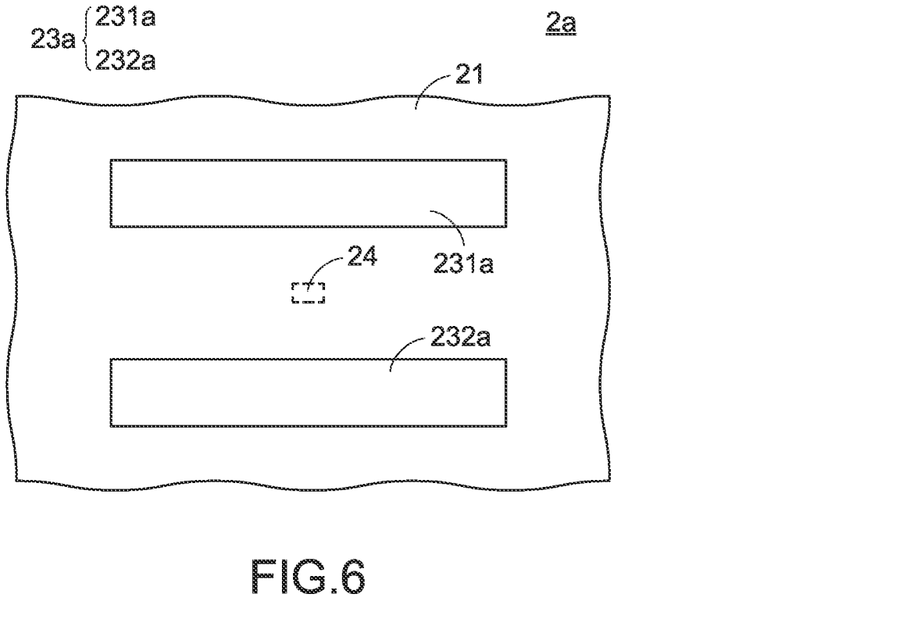
FIG. 6 is a schematic top view illustrating a touchpad module according to a second embodiment of the present invention.

FIG. 6 is a schematic top view illustrating a touchpad module according to a second embodiment of the present invention. Except for the supporting structure, the other components of the touchpad module 2a of this embodiment are similar to those of the touchpad module 2 as shown in FIGS. 2 to 5. In this embodiment, the supporting structure 23a comprises a first strip structure 231a and a second strip structure 232a. The first strip structure 231a and the second strip structure 232a are opposed to each other. In addition, the pressure sensing unit 24 is arranged between the first strip structure 231a and the second strip structure 232a.

Figure 7:
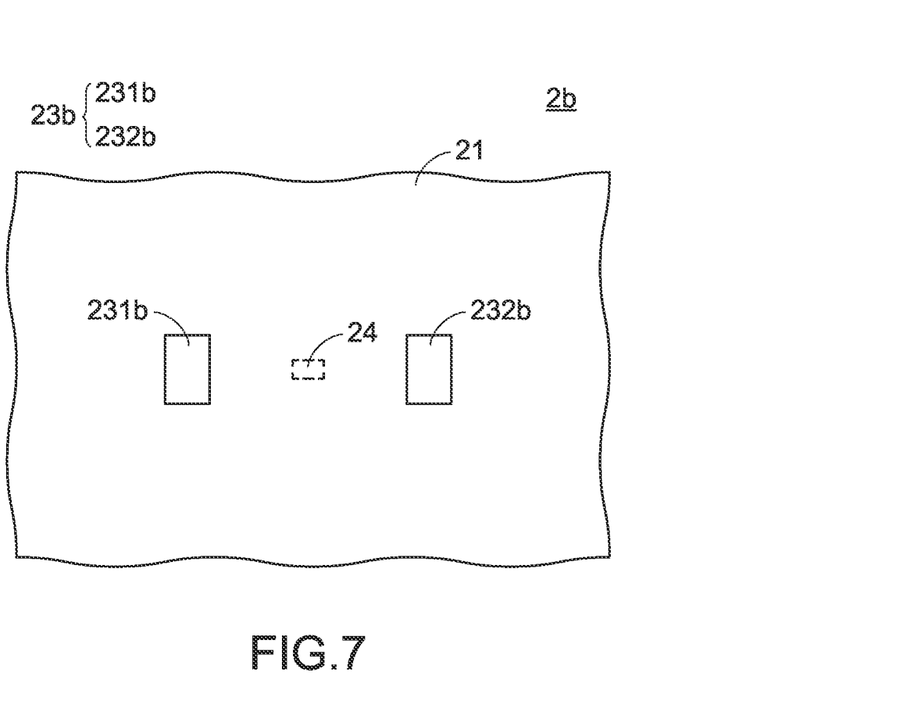
FIG. 7 is a schematic top view illustrating a touchpad module according to a third embodiment of the present invention.

FIG. 7 is a schematic top view illustrating a touchpad module according to a third embodiment of the present invention. Except for the supporting structure, the other components of the touchpad module 2b of this embodiment are similar to those of the touchpad module 2 as shown in FIGS. 2 to 5. In this embodiment, the supporting structure 23b comprises a first post structure 231b and a second post structure 232b. The first post structure 231b and the second post structure 232b are opposed to each other. In addition, the pressure sensing unit 24 is arranged between the first post structure 231b and the second post structure 232b.

Figure 8:
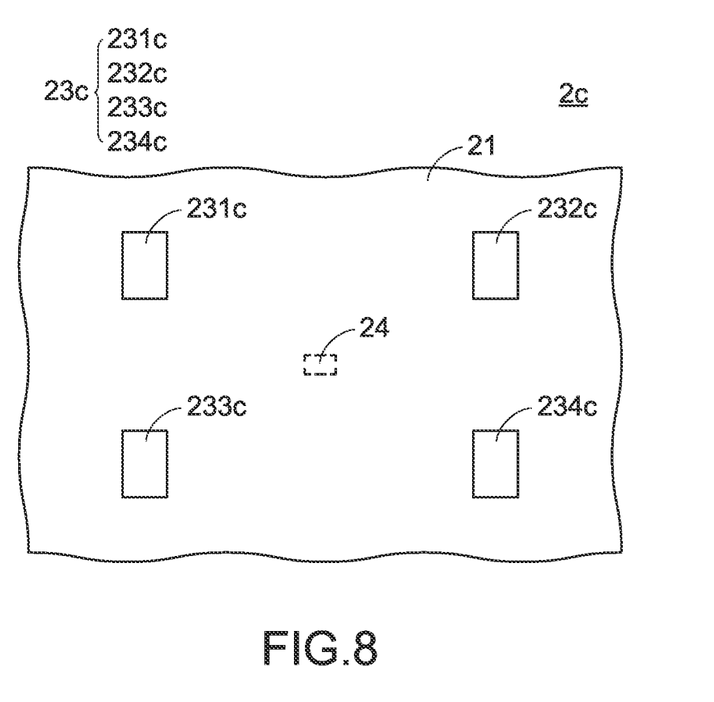
FIG. 8 is a schematic top view illustrating a touchpad module according to a fourth embodiment of the present invention.

FIG. 8 is a schematic top view illustrating a touchpad module according to a fourth embodiment of the present invention. Except for the supporting structure, the other components of the touchpad module 2c of this embodiment are similar to those of the touchpad module 2 as shown in FIGS. 2 to 5. In this embodiment, the supporting structure 23c comprises a first post structure 231c, a second post structure 232c, a third post structure 233c and a fourth post structure 234c. Preferably but not exclusively, the base plate 21 is a rectangular plate. The first post structure 231c, the second post structure 232c, the third post structure 233c and the fourth post structure 234c are respectively located near four corners of the base plate 21. In addition, the pressure sensing unit 24 is arranged between the first post structure 231c, the second post structure 232c, the third post structure 233c and the fourth post structure 234c.

In the embodiments of the touchpad modules as shown in FIGS. 4, 6, 7 and 8, the supporting structures have different profiles. However, each of the supporting structures can provide a stable supporting force in the region between the touch member 21 and the base plate 21. Consequently, the touch member 22 can be moved in the direction toward the base plate 21 in response to the external pressing force, and the touch member 22 will not excessively inclined. Moreover, in case that the pressing force is exerted on the position near the corner of the touch member 22, the touch member 22 is possibly inclined while the touch member 22 is moved toward the base plate 21. In an embodiment, the pressure sensing unit 24 has the function of sensing the inclination angle of the touch member 22. According to the inclination angle of the touch member 22, the magnitude of the calculated pressing force is compensated.

From the above descriptions, the present invention provides the touchpad module and the computing device using the touchpad module. In the touchpad module of the present invention, the pressure sensing unit is directly installed on the touch member. According to the displacement amount of the touch member relative to the base plate, the magnitude of the pressing force exerted on the touch member is calculated. Due to this structural design, it is not necessary to additionally install plural cantilever structures on the base plate. Since the structure of the touchpad module is simplified and the touchpad module is assembled easily, the fabricating cost and the overall weight of the touchpad module are effectively reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:
   a base plate;
   a touch member located over the base plate, wherein the touch member is movable toward the base plate;
   a supporting structure arranged between the base plate and the touch member; and
   a pressure sensing unit installed on the touch member, wherein the pressure sensing unit is arranged between the touch member and the base plate, wherein the pressure sensing unit is a micro-electro-mechanical system accelerometer,
   wherein while the touch member is pressed in response to an external pressing force, the touch member is moved downwardly toward the base plate to compress the supporting structure, so that the supporting structure is subjected to deformation and the touch member has a displacement amount, wherein according to the displacement amount of the touch member, a magnitude of the pressing force exerted on the touch member is sensed by the pressure sensing unit, and a pressure sensing signal is outputted from the pressure sensing unit,
   wherein said supporting structure is arranged around the pressure sensing unit and said supporting structure is selected from the group consisting of a rectangular raised structure, a plurality of strip structures and a plurality of post structures.

2. The touchpad module according to claim 1, wherein the touch member comprises a circuit board and a covering plate, wherein the covering plate is located over the circuit board, the supporting structure is arranged between the circuit board and the base plate, the pressure sensing unit is installed on the circuit board, and the pressure sensing unit and the circuit board are electrically connected with each other.

3. The touchpad module according to claim 1, wherein the supporting structure is a rectangular raised structure, and the rectangular raised structure comprises a first wall body, a second wall body, a third wall body and a fourth wall body, wherein the first wall body and the second wall body are opposed to each other, the third wall body and the fourth wall body are opposed to each other, the first wall body and the second wall body are arranged between the third wall body and the fourth wall body, and the first wall body, the second wall body, the third wall body and the fourth wall body are arranged around the pressure sensing unit.

4. The touchpad module according to claim 1, wherein the supporting structure comprises a first strip structure and a second strip structure, wherein the first strip structure and the second strip structure are opposed to each other, and the pressure sensing unit is arranged between the first strip structure and the second strip structure.

5. The touchpad module according to claim 1, wherein the supporting structure comprises a first post structure and a second post structure, wherein the first post structure and the second post structure are opposed to each other, and the pressure sensing unit is arranged between the first post structure and the second post structure.

6. The touchpad module according to claim 1, wherein the supporting structure comprises a first post structure, a second post structure, a third post structure and a fourth post structure, and the base plate is a rectangular plate, wherein the first post structure, the second post structure, the third post structure and the fourth post structure are respectively located near four corners of the base plate, and the pressure sensing unit is arranged between the first post structure, the second post structure, the third post structure and the fourth post structure.

7. The touchpad module according to claim 1, wherein there is a first gap between the touch member and the base plate when the touch member is not pressed, and there is a second gap between the touch member and the base plate after the touch member is pressed down, wherein the first gap is larger than the second gap, and the displacement amount is equal to a difference value between the first gap and the second gap.

8. The touchpad module according to claim 1, wherein the supporting structure is made of a soft collapsible material.

9. A computing device, comprising:
   a casing, wherein a fixing frame is concavely formed in the casing;
   a processor disposed within the casing; and
   a touchpad module disposed within the fixing frame and electrically connected with the processor, wherein the touchpad module comprises:
   a base plate;
   a touch member located over the base plate, wherein the touch member is movable toward the base plate;

a supporting structure arranged between the base plate and the touch member; and a pressure sensing unit installed on the touch member, wherein the pressure sensing unit is arranged between the touch member and the base plate, wherein the pressure sensing unit is a micro-electro-mechanical systems accelerometer, wherein while the touch member is pressed in response to an external pressing force, the touch member is moved downwardly toward the base plate to compress the supporting structure, so that the supporting structure is subjected to deformation and the touch member has a displacement amount, wherein according to the displacement amount of the touch member, a magnitude of the pressing force exerted on the touch member is sensed by the pressure sensing unit, and a pressure sensing signal is outputted from the pressure sensing unit, wherein said supporting structures is arranged around the pressure sensing unit and said supporting structure is selected from the group consisting of a rectangular raised structure, a plurality of strip structures and a plurality of post structures.

\* \* \* \* \*